United States Patent [19]

Kellie et al.

[11] Patent Number: 4,659,221
[45] Date of Patent: Apr. 21, 1987

[54] ENDOSCOPE

[75] Inventors: Truman F. Kellie, West Chester, Ohio; Teresa M. Motz, Rochester, N.Y.; Mark B. Manley, Sharonville; Charles W. Donaldson, Blanchester, both of Ohio

[73] Assignee: General Electric Company, Cincinnati, Ohio

[21] Appl. No.: 593,168

[22] Filed: Mar. 26, 1984

[51] Int. Cl.$^4$ .............................................. G02B 23/24
[52] U.S. Cl. ...................................... 356/241; 350/527
[58] Field of Search ................. 356/241; 350/506, 527

[56] References Cited

U.S. PATENT DOCUMENTS

| 3,285,122 | 11/1966 | Buchbinder et al. | 88/14 |
| 3,661,440 | 5/1972 | Takahashi | 356/241 X |
| 3,761,186 | 9/1973 | Wason | 356/241 |
| 3,892,494 | 7/1975 | Baker et al. | 356/239 |
| 4,305,661 | 12/1981 | Pryor et al. | 356/241 |

FOREIGN PATENT DOCUMENTS 476803 of 1938 United Kingdom ................ 350/506

OTHER PUBLICATIONS

Titan Product brochure, "Titan Zoom-A-Bore", Titan Tool Supply Company, Inc., Buffalo, N.Y., Jan. 1975.

Primary Examiner—Davis L. Willis
Assistant Examiner—Matthew W. Koren
Attorney, Agent, or Firm—Gregory A. Welte; Derek P. Lawrence

[57] ABSTRACT

The present invention relates to an endoscope for the examination of the interiors of lightening holes in gas turbine engine blades. A light beam is projected toward a beam splitter and reflected by the beam splitter into the lightening hole for illumination of the hole. An observation lens system is arranged to allow an observer to view the illuminated hole through the beam splitter.

9 Claims, 2 Drawing Figures

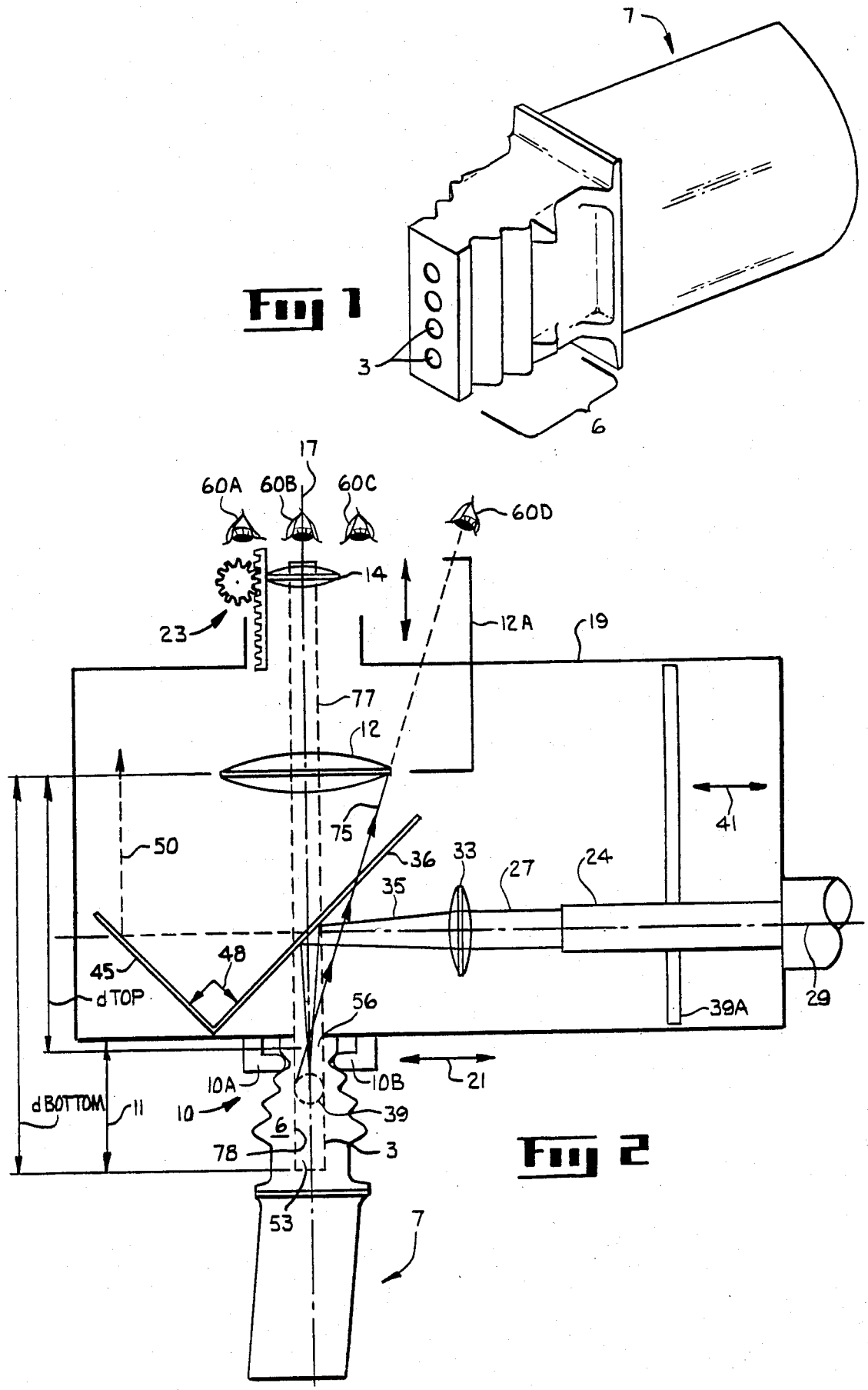

ENDOSCOPE

The present invention relates to endoscopes and, more particularly, to apparatus for examining the interiors of cylindrical holes contained in gas turbine engine blades.

BACKGROUND OF THE INVENTION

Gas turbine engines contain compressor blades which can experience centrifugal forces exceeding 15,000 g's because of the high rotational speeds at which they operate. It is clearly desirable to reduce the mass of such blades, and this reduction is commonly done by drilling holes 3 in FIG. 1 in the root region 6 of a blade 7. Such holes are termed lightening holes, because they lighten the weight of the blade.

The interior surface of such holes 3 must be smooth. A nonsmooth surface, such as one having a scratch produced by an imperfect drill bit, can cause a stress riser to occur at the location of the scratch. Such a stress riser is not desirable in blades which are subjected to the large centrifugal forces discussed above. It is desirable to have an apparatus for examining the interior of the hole 3 for detecting scratches or other defects.

OBJECTS OF THE INVENTION

It is an object of the present invention to provide a new and improved endoscope.

It is a further object of the present invention to provide a new and improved apparatus for examination of lightening holes in gas turbine engine blades.

SUMMARY OF THE INVENTION

One form of the present invention utilizes an illumination means for projecting a light beam along a projection axis, a support for supporting a compressor blade such that the axis of a lightening hole coincides with an observation axis, a beam splitter for (i) directing the light beam along the observation axis, into the hole, and (ii) for transmitting an image of the hole from the hole along the observation axis, and an observation lens means for viewing the image of the hole which is transmitted by the beam splitter.

BRIEF DESCRIPTION OF THE DRAWING

FIG. 1 illustrates a gas turbine engine blade and lightening holes contained therein.

FIG. 2 illustrates one form of the present invention.

DETAILED DESCRIPTION OF THE INVENTION

FIG. 2 illustrates a support means 10 which contains two flanges 10A and 10B which define a slot therebetween for supporting the root 6 of a gas turbine engine blade 7. The blade 7 contains at least one lightening hole 3. Such holes are commonly cylindrical and of a diameter $\frac{1}{4}''$ and a depth (dimension 11) of about two inches.

An observation lens system 12A includes lenses 12 and 14 which are positioned along an observation axis 17. The lenses 12 and 14 are supported by a frame indicated as rectangle 19. The support means 10 is movable in the direction of arrows 21 such that the axis (not specifically shown) of the lightening holes 3 are alignable with the observation axis 17. Further, the fit between the blade and the flanges 10A and B is such that the blade 7 can slide into and out of the plane of the Figure to align a selected lightening hole 3 with the observation axis.

Lens 12 is preferably 50 mm in diameter, having a 50 mm focal length, and an f-number of 0.95. Lens 14 is preferably a wide angle Erfle of 40 mm diameter, 32 mm focal length, and is mounted on a rack and pinion focusing system 23.

A fiber optical bundle 24, such as one associated with light source Model No. 5000.70, available from R. L. Wolf Medical Inst. Corp., located in Rosemont, Ill., is fastened to the frame 19 and projects a light beam 27 along a projection axis 29. The light beam 27 is collected by a collecting lens 33 and focused as a focused beam 35 toward a beam splitter 36 which directs the focused beam 35 to a focal region 39. The beam splitter 36 diverts the focused beam 35 from the projection axis 29, along the the observation axis 17. The collecting lens 33 is preferably 22.4 mm diameter and has a focal length of 25 mm.

The optical bundle 24 is supported by a slide 39A, as is the collecting lens 33. Movement of the slide in the direction of arrows 41 causes a corresponding motion of the focal region 39 along the observation axis 17, thereby moving the focal region 39 along the interior of the lightening hole 3. This motion illuminates different parts of the lightening hole 3 for examination by an operator viewing through the observation lens system 12A. A black surface 45 is positioned normal (that is, angle 48 is 90°) to the beam splitter 36 to reduce reflections of light, such as reflections illustrated by light ray 50, which are transmitted through the beam splitter 36.

One important aspect of the present invention lies in the use of the lens 12, which is a short focal length (50 mm), large aperture lens (f 0.95). This focal length produces the result that when the focal region 39 in FIG. 2 of the lens is positioned near the bottom 53 of the lightening hole 3, the top 56 of the hole is significantly closer to the lens 12 with the result that the magnification of the top 56 is greater than the magnification of the bottom 53. This differential in magnification provides a tunnel viewing effect. The tunnel effect occurs when the ratio of the distance between the top 56 of the hole and the lens 12 ($d_{top}$) to the distance between the bottom 53 and the lens 12 ($d_{bottom}$) (i.e., the ratio $d_{bottom}/d_{top}$) is less than two. Applicants have obtained satisfactory results with a ratio of 1.5, in which the distance $d_{top}$ is 100 mm and the distance $d_{bottom}$, is 150 mm.

This tunnel viewing effect is also in part a result of the large aperture and low f-number of the lens 12. The large aperture allows the user to position his eye at any of the positions 60A–C and yet to see the interior wall of the lightening hole 3, because the large aperture allows capture of reflected light ray 75. This capture effectively allows the observer to position his eye at position 60D.

An invention has been described wherein an illumination means selectively focuses an illuminating light beam to a beam splitter and thence into a cylindrical hole in a turbine engine blade for selectively illuminating portions of the hole. An image of the hole is transmitted through the same beam splitter to a short focal length, large aperture lens which enhances the tunnel viewing effect of the hole. The tunnel viewing refers to the fact that the part of the hole near the lens is magnified to a greater degree than the part of the hole farther from the lens, with the result that the observer can view regions of the hole to which he is otherwise blind.

For example, if the hole 3 in FIG. 2 is extended as an imaginery cylinder 77, the observer's eye can be positioned at region 60A which is not within direct line of sight of surface 78. However, the low f-number of the lens 12 allows the observer to sight along ray 75, thereby putting the observer into the line of sight of surface 78.

Numerous modifications and substitutions can be undertaken without departing from the true spirit and scope of the present invention. What is desired to be secured by the Letters Patent is the invention as defined in the following claims.

We claim:

1. Apparatus for examining a cylindrical hole in a turbine engine blade having an illumination axis and an observation axis definable therein, comprising:
   (a) illumination means for projecting a light beam along the illumination axis;
   (b) support means for supporting the blade such that a longitudinal axis of the cylindrical hole substantially coincides with the observation axis;
   (c) beam splitting means for directing the light beam of (a) along the observation axis, into the cylindrical hole, and for transmitting an image of the hole along the observation axis, away from the cylindrical hole; and
   (d) observation lens means comprising a short focal length, large aperture lens for enhancing the tunnel-viewing effect of the hole, whereby an observer can view a surface of the hole which is not within his direct line of sight.

2. Apparatus for the inspection of a cylindrical lightening hole in a base of a gas turbine engine blade, comprising:
   (a) support means for supporting the blade such that a longitudinal axis of the cylindrical hole is alignable with an observation axis;
   (b) a beam splitter which intersects the observation axis;
   (c) a light source for projecting a beam of light along an illumination axis to the beam splitter for reflection therefrom along the observation axis, into the cylindrical hole;
   (d) observation lens means positioned on the observation axis for receiving light passing through the beam splitter, from the cylindrical hole, and for differentially magnifying an image of the cylindrical hole contained in said received light.

3. Apparatus according to claim 2, and further comprising:
   (e) a light absorbing surface positioned near the beam splitter for absorbing at least some of the light transmitted by the beam splitter along the illumination axis.

4. Apparatus according to claim 3, and further comprising:
   (f) a lens means for focusing the light beam of (c) at a focal region within the cylindrical hole and
   (g) positioning means for positioning the lens means of (f) at selectable positions along the illumination axis to thereby position the focal region at selectable positions along the observation axis.

5. Apparatus according to claim 4 in which the light source of (c) comprises a bundle of optical fibers which project a beam of light to the lens means.

6. Apparatus according to claim 5 in which the observation lens means of (d) comprises a lens of approximate diameter of 50 mm, approximate focal length of 50 mm, and approximate f-number of 0.95 for enhancing the tunnel viewing effect in viewing the cylindrical holes.

7. A method for examining a cylindrical hole in a turbine engine blade comprising:
   (a) projecting a light beam along an illumination axis;
   (b) supporting the turbine blade such that a cylindrical hole in the turbine blade is aligned with an observation axis;
   (c) directing the light beam along the observation axis into the cylindrical hole; and
   (d) transmitting an image of the cylindrical hole along the observation axis, away from the cylindrical hole.

8. A method as in claim 7, also comprising:
   (e) differentially magnifying opposite ends of the cylindrical hole with a short focal length, large aperture observation lens.

9. Apparatus, with an illumination axis and an observation axis, for examining cylindrical lightening holes in turbine engine blades, comprising:
   (a) a bundle of optical fibers which project a beam of light along the illumination axis;
   (b) a support with two flanges and a slot supporting the blade so the cylindrical lightening hole is aligned with the observation axis;
   (c) a frame to which the bundle of optical fibers and support are connected;
   (d) a beam splitter connected to the frame positioned to direct the light beam along the observation axis into the cylindrical lightening hole;
   (e) an observation lens with a 50 mm focal length and f 0.95 aperture positioned in the frame to differentially magnify opposite ends of the cylindrical lightening hole;
   (f) a light absorbing surface substantially normal to the beam splitter such that some of the light beam transmitted by the beam splitter is absorbed by the light absorbing surface;
   (g) a collecting lens adjacent the bundle of optical fibers to focus the beam of light in the cylindrical lightening hole; and
   (h) a slide supporting the bundle of optical fibers and collecting lens at selectable positions along the illumination axis.

* * * * *